United States Patent [19]

Alexander et al.

[11] Patent Number: 5,414,834

[45] Date of Patent: May 9, 1995

[54] METHOD AND APPARATUS FOR DATA STORAGE AND INTERCHANGE USING A RELATIONAL DATABASE TABLE, AND A DATA RECORD FOR USE IN CONNECTION THEREWITH

[75] Inventors: Virginia L. Alexander; James L. Gaudet; Lloyd E. Jordan, II; Raymond Hernandez, all of Austin, Tex.

[73] Assignee: International Business Machines Corporation, Armonk, N.Y.

[21] Appl. No.: 624,457

[22] Filed: Dec. 7, 1990

Related U.S. Application Data

[63] Continuation of Ser. No. 179,316, Apr. 8, 1988, abandoned.

[51] Int. Cl.⁶ ............................................. G06F 15/40
[52] U.S. Cl. .................. 395/600; 364/974.4; 364/DIG. 2; 364/974.5; 364/974.6
[58] Field of Search ................................ 364/200, 900

[56] References Cited

U.S. PATENT DOCUMENTS

| | | | |
|---|---|---|---|
| 3,938,100 | 2/1976 | Steiner | 364/200 |
| 4,128,891 | 12/1978 | Lin et al. | 364/900 |
| 4,221,003 | 9/1980 | Chang et al. | 364/900 |
| 4,497,039 | 1/1985 | Kitakami et al. | 364/900 |
| 4,628,451 | 12/1986 | Sawada et al. | 364/200 |
| 4,654,777 | 3/1987 | Nakamura | 364/200 |
| 4,680,705 | 7/1987 | Shu | 364/300 |
| 4,780,810 | 10/1988 | Torii et al. | 364/200 |
| 4,805,099 | 2/1989 | Huber | 364/200 |
| 4,829,427 | 5/1989 | Green | 364/200 |
| 4,839,799 | 6/1989 | Takahashi et al. | 364/200 |
| 4,841,472 | 6/1989 | Izuhara et al. | 364/900 |
| 4,845,624 | 7/1989 | Clayton et al. | 364/200 |
| 4,851,989 | 7/1989 | Kagimasa et al. | 364/200 |
| 4,918,593 | 4/1990 | Huber | 364/200 |

OTHER PUBLICATIONS

"Document Interchange Format (DIF)", R. Gray and G. Evans, *Office Automation Conference Digest, 1985* pp. 35–40.

"Editing Records From Internationally Available Databases on Intelligent Terminals", A. Hopkinson, International Conference on the Application of Internationally Available Databases to National Scientific and Technical Information Systems, 1984, vol. 2, pp. 490–509.

"Multi–Vendor Information Interchange", D. Pistole, *Office Automation Conference Digest* 1985, pp. 41–49.

"Proposed Data Structure for Exchange of Power System Analytical Data", *IEEE Transactions on Power Systems*, vol. PWRS-1, No. 2, May 1986, pp. 8–16.

(List continued on next page.)

*Primary Examiner*—Christopher B. Shin
*Attorney, Agent, or Firm*—Karl F. Milde, Jr.

[57] ABSTRACT

A digital computer system and method for storing and retrieving data contained in a "relational data table" in such a way that individual items of data are readily accessible and the data itself is compressible. The items of data are arranged in the table in a plurality of rows and columns. The items of data in each given column are of the same type (fixed length character, variable length up to a prescribed maximum length, etc.). The items of data are arranged in a particular data format which comprises a plurality of "column descriptor" or "C" records, each of which is associated with one column of the table, followed by a plurality of "data" or "D" records which include the items of data in the table. The D records and C records contain the following information: Each D record includes one or more of the items of data from a particular table row. It is therefore associated with this table row and with at least one table column. Each C record, which is associated with one of the table columns, includes an identification of the associated column, an identification of a D record which includes an item of data in the associated column, and a number defining the absolute displacement of the beginning of the items of data arranged in the respective column with respect to the beginning of the D records associated with that column.

14 Claims, 4 Drawing Sheets

OTHER PUBLICATIONS

"IEEE Trial-Use Standard for Media-Independent Information Transfer", Microprocessor Standards Committee of the IEEE Computer Society Institute, IEEE Std 949, Nov. 1985.

"Communicating in The Technical Office", *IEEE Spectrum*, Apr. 1986, pp. 63–67.

"One Big Headache: Incompatible Operating Systems and File Transfer", G. Baley, *Data Communications*, Mar. 1985, pp. 115–119.

"When The Micro Talks, Will The Mainframe Listen?", C. Spencer, *Business Software*, Oct. 1985, pp. 24–34.

"Painless Extraction", W. Rash, *PC World*, Jul. 1986, pp. 260–267.

"File-Transfer Headaches-and Cures", C. Lu, *High Technology*, Sep. 1985, pp. 54–56.

"Developing The Common Communication Format", A. Hopkinson, *Information Development*, vol. 2, No. 2, Apr. 1986, pp. 99–104.

"Implementation of Communication and Data Conversion Techniques for Clinical Engineering", D. Darnel, *IEEE Frontiers of Engineering and Computing and Health Care*, 1984, pp. 137–140.

"Coefficient's Vterm/220 Links PCs to DEC Via Multiple Protocols", D. Molta, *Hardcopy*, Jan. 1988, pp. 90–92.

"IGES and Beyond", R. Stauffer, *CIM Technology*, Summer 1985, pp. 20–21.

"Simplified Integration of Prolog with RDBMS", H. Berghel, *Data Base*, Spring 1985, pp. 3–12.

"Stimulus Data Interchange Format", C. Pieper, *VLSI Systems Design*, Jul. 1986, pp. 76–77.

"OSI's Final Frontier: The Application Layer", E. Roux, *Data Communications*, Jan. 1988, pp. 137–145.

"Micro-To-Mainframe Choices Expand", J. Victor, *Mini-Micro Systems*, May 1985, pp. 91–100.

"Has It Become Practical To Transfer Spreadsheets Between Programs", T. Berry, *Business Software*, Jan. 1987, pp. 54–59.

"A Synergistic Link", D. Coleman, *Hardcopy*, Jun. 1985, pp. 111–112.

"Distributed Interoffice Mail System Based on Integrated Document Interchange Protocols", S. Sakata and T. Ueda, *NEC Research and Development*, No. 76, Jan. 1985, pp. 9–17.

"Document Interchange Architecture", D. Mills et seq., *IBM Technical Disclosure Bulletin*, vol. 22, No. 6, Nov. 1979, pp. 2405–2407.

"Micro to Mainframe", F. Derfler, *PC Magazine*, May 13, 1986, pp. 116–123.

"Computer Science and Technology: Report on Approaches to Database Translation", Leonard Gallagher and Sandra Salazar, National Bureau of Standards, Washington, D.C., May 1984, PB84–217900.

FIG.3

TABLES = CITIES

| NAME | STATE | REGION | POPULATION |
|---|---|---|---|
| AUSTIN | TX | SW | 450,000 |
| CHICAGO | IL | MW | 3,200,000 |
| DALLAS | TX | SW | 1,700,000 |
| SAN ANTONIO | TX | SW | 1,100,000 |
| SAN JOSE | CA | W | 700,000 |

ROWS — ONE PER CITY

COLUMNS - ONE PER INFORMATION FIELD

FIG.4

| COLUMN NAME | NAME | STATE | REGION | POPULATION |
|---|---|---|---|---|
| DATA TYPE # CHARACTERS NULLABLE ? | VARCHAR 30 REQUIRED | CHAR 2 REQUIRED | VARCHAR 30 NULLABLE | INTEGER 8 REQUIRED |
| D RECORD NUMBER | 1 | 2 | 2 | 3 |
| D RECORD POSITION | BEGINNING (OF DATA PORTION OF D RECORD) | BEGINNING | BEGINNING PLUS LENGTH OF STATE COL. | BEGINNING |

METHOD AND APPARATUS FOR DATA STORAGE AND INTERCHANGE USING A RELATIONAL DATABASE TABLE, AND A DATA RECORD FOR USE IN CONNECTION THEREWITH

This application is a continuation of application Ser. No. 179,316, filed Apr. 8, 1988, now abandoned.

BACKGROUND OF THE INVENTION

The present invention relates to the field of computers, in general, and to data storage and retrieval systems, in particular.

Database manager programs are known which facilitate the storage and retrieval of data stored on a record medium, such as a Winchester hard disk or a 5¼ inch diskette, in a digital computer system. Particularly as the size of computers and their associated peripheral storage devices is reduced, it is desirable to make efficient use of the available storage area.

The data format in a database normally includes a plurality of data fields of various sizes. The size of each field is set equal to the number of bytes in an item of data for a fixed length item, or equal to the maximum length of an item of data for a variable length item. In cases of variable length data items, or where an item is not always present for a particular field, the data can be compressed by reducing the size of the fields to accommodate only the items of data actually present.

Thus, for example, in an employee record which comprises successive fields for the employee's name, social security number, birthdate, etc., the name field will be of variable length whereas the social security number and birthdate fields will be of fixed length. Of the latter two fields, it may always be necessary to enter a social security number in its respective field; however, it may not be necessary to include the birthdate. Consequently, the data in these respective fields may take the following form:

JOHN E DOE/987654321/012345
MARY J POPPINS/123456789/000000

The first or name field must be long enough to accommodate a name of any length; the second field must be exactly nine characters long and the third field six characters long. In some cases, no data is entered into the birthdate field, as indicated in the example above by the 0's.

When these items of data arranged in these fields are stored, it is desirable to store only the actual useful data. To accomplish this, the database manager must vary the size of the fields in storage so that they are no larger than the actual data requires. Depending upon the data format in storage, this may be a simple, or a very difficult task.

One data format which does not lend itself to straightforward data compression is a so-called "relational database table". A "relational table" is a two dimensional array of data items; that is, an array of data items which form rows and columns. Each row in the table comprises one or more records of information. Each data record comprises one or more fields in which are located the items of data. The fields may have different attributes, such as a social security number, birthdate, etc., or a group of fields may have the same attribute, such as a group of statistical samples for a given parameter. A column in the table is the same field in all of the records. All data items for a column must be of the identical data type (integer, floating point number, fixed length character, variable length graphic, etc.).

Consequently, any specific data item in the table belongs to exactly one row and one column, and can be located as such.

A typical use of a relational table is to describe a collection of homogeneous data objects. A row represents a single instance of an object and the columns are descriptive data attributes about the object. For example, a table of data describing employees could have a row defined for each employee with column values for name, social security number, birthdate, etc.

A "column" in a relational table may therefore be defined as one unit of the vertical dimension of the table. A column normally has a specific data attribute which applies to all data items having the column location. A column, which is analogous to a data "field", is applicable to all rows in the table.

A "row" in a relational table may be defined as one unit of the horizontal dimension of the table. A row contains data items from each column in the table although data items may be missing from some of the row and column locations. All columns are considered to be in the same order for all rows. A row is thus analogous to a "record" in a non-relational database.

There is no presumption of the order of rows within a table. An index can be created by the user to logically order the rows of a table in different ways, each index thus defining a separate ordering. The term "index" may thus be defined as a collection of the columns in a table with ascending or descending order directives. Once defined, an index is internally maintained by the database manager. It is never referenced in user requests for manipulating or retrieving data, but is used internally whenever an access is determined to be faster using an existing index than through a sequential file search.

An index can be created at any time and dropped at any time. There is no requirement that any index exists for a table.

A "base table" is a relational table that is physically stored on a record medium as real data. A "view" is a relational table that does not exist in physical storage but is derived from one or more base tables.

Given this type of data, a "database" may be defined as a collection of relational tables, catalog tables and recovery logs. A database may, for example, be restricted to being within a single OS/2 ™ file system. This restriction ensures all catalog and recovery functions can be performed on any data under its control at any time. Databases may be stored on hard files or on diskettes. Multiple databases can be placed on a single OS/2 ™ file system.

Another term which is necessary to understand for the present invention is the so-called "codepage" environment of a database. A "codepage" may be defined as a translation table or mapping of the set of bytes (of which there are 256) into character representations produced by a printer, display, or other input/output device. Well known codepages include the ASCII (American National Standard Code for Information Interchange) IBM National and International codepages 437 and 850, respectively, as well as the EBCDIC character set (Extended Binary-coded Decimal Interchange Code).

In interchanging data between one database and another, it is necessary to know, and keep track of the codepage of the data so that data integrity may be maintained from one codepage to another, if required. However, the interchange method should also allow the structure that exists on the source database to be created on the target database. This means that the table name, column names, column types and indices must be carried as part of the interchange.

SUMMARY OF THE INVENTION

It is a primary object of the present invention to provide, an interchange format for use with database management systems which permits a relational database table to be stored on a record medium with efficient use of the available storage area.

It is a more specific object of the present invention to provide a file format for a relational database table which allows file compression when an item of data is null or shorter than its maximum length.

It is a more specific object of the present invention to provide a file format for the exchange of the content of a relational table between databases.

These objects, as well as other objects which will become apparent from the discussion that follows, are achieved, according to the present invention, by (1) transmitting data or (2) storing and retrieving data to and from a record medium, in a relational table file format which comprises:

(1) a plurality of data ("D") records, each D record being of variable length and including items for a particular row arranged serially in succession, thereby forming a plurality of data rows and columns with each item of data in each D record arranged in a separate column, there being at least one D record per row of data with a constant number of D records in each row of the table; and (2) a plurality of column descriptor ("C") records, each C record being associated with one table column and specifying:

(i) the identification of said column associated with the respective C record;

(ii) the identification of the associated D record in a table row which contains the item of data to be located in said associated column;

(iii) the maximum number of characters forming an item of data in said associated column, if the number is not implied by the data type; and (iv) the beginning position of the associated column in said associated D record.

Preferably all of the column descriptor ("C") records precede the data ("D") records in the series arrangement of the records during transmission or storage/retrieval.

The column descriptor ("C") records must have data ("D") record identifiers and positions in ascending order; however, the column descriptor records themselves may be arranged in any order.

With this table file format, two fields are provided within each of the column descriptor ("C") records for locating the data for the column within a row's worth of data; namely, the data record identifier, which specifies which data ("D") record (of the several data records comprising a row of data) contains the data for this column, and the data record position which is used to locate the data for the column within the previously selected data record which is part of a row of data. This record position thus represents the absolute displacement of the item of data for the respective column within the particular data record.

The file format also makes provision in a C record for the identification of the associated column (column name) as well as the attributes of this column, such as data type, data precision, data nullability and codepage environment. All these attributes of each column are therefore stored only once in a table. In addition, the format is easily expandable for additional column attributes.

Advantageously, no data loss problems are attributable to the file format since it does not force any conversions of database data to occur when transferring data from one database to another. The absence of forced conversions tends to minimize processing time when the data exchange is between like systems.

In general, using the file format described above, any column is compressible if it is the last column within its data record. This is accomplished by starting a new data record after any varying length or nullable data field. The beginning of this field is identified by the column descriptor record, whereas the end of this field is identified by a preceding null indicator and/or length indicator in the 'D' record.

Preferably, only those nullable or varying length fields are compressed which have a maximum length longer than an arbitrary constant. For example, such constant may be made equal to the longest length of any supported numeric value. Variable length fields identified as potentially very long (e.g. by data types designated as "LONG VARCHAR" and "LONG VARGRAPHIC") may each occupy their own exclusive data record.

In addition to the column descriptor ("C") and data ("D") records, the relational table may contain other records such as a header ("H") record, a table ("T") record, index ("AI") records and an end ("AE") record. The H, T and AI records may each specify several items of information as will be discussed in detail hereinbelow. The AE record preferably specifies only the end of the table.

A record length field is added to the beginning of all records (H records, T records, C records, D records, AI records and AE records). The C records precede the D records in the series arrangement of records on the record medium.

Single byte and double byte codepage fields are added to the H record which begins the table file. Single byte and double byte codepage fields are also included in the C records. The codepage fields in the H record specify the codepage(s) of character data in the table with two possible exceptions:

(1) Column data within data portions of data records; and (2) Data inside additional application-specific records.

The codepage fields in the C records of character (and graphic) columns specify the codepage(s) of the data for the respective column. A character column of "bit data." may have zeros for its single and double byte codepages to signify that the bit data will not be translated into characters when printed.

These codepage identification fields allow programs responsible for migration of database data between a host computer and a personal computer to identify which fields are to have character translations applied. They also allow the user a choice of options when migrating data from one database to another; for example, they permit the user to accept or reject data coming from a different codepage environment.

For a full understanding of the present invention, reference should now be made to the following detailed description of the preferred embodiment of the invention and to the accompanying drawings.

BRIEF DESCRIPTION OF THE DRAWINGS

FIG. 3 is an example of data which may be arranged in a relational table.

FIG. 4 is a specific example of a relational table, containing columns of different data types and data records of different length.

DESCRIPTION OF THE PREFERRED EMBODIMENT

The preferred embodiment of the present invention will now be described with reference to FIGS. 1–6 of the drawings.

Figure 1:
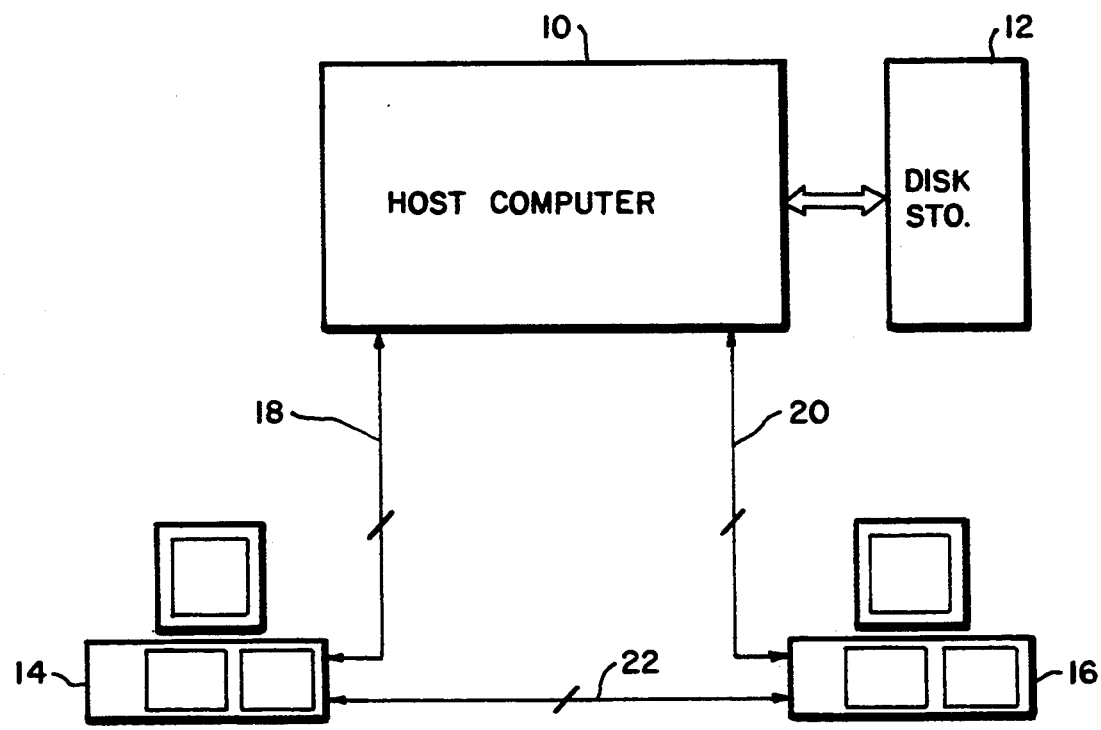
FIG. 1 is a block diagram showing a small network comprising a host computer and two personal computers.

FIG. 1 shows the general computer hardware environment of the present invention. The present invention may be resident on a single personal computer, two or more personal computers connected together to exchange information or, as shown in FIG. 1, two or more personal computers connected together and to a host computer such as an IBM 370 system. FIG. 1 illustrates a host computer 10 which operates with a large disk storage file 12. A first personal computer 14 and a second personal computer 16 are connected to the host computer 10 via multiple lines 18 and 20, respectively, which carry data and control information. The two personal computers are also connected together via data and control lines 22.

Figure 2:
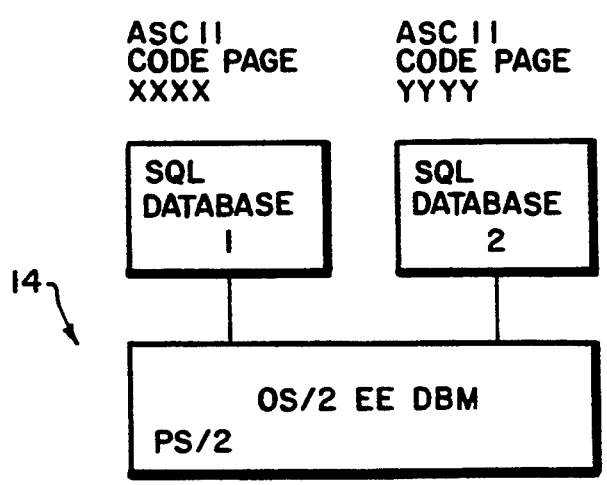
FIG. 2 is a block diagram of a personal computer system using an operating system that supports a database manager and two separate databases.

The database environment of the present invention can take the form illustrated in FIG. 2. In this case, the PS/2 TM personal computer operates with an OS/2 Extended Edition TM Database Manager adaptation of the Integration Exchange Format (IXF) data interchange software that enables the exchange of relational table structures and data. The character data is stored in one or more databases in a specific codepage environment such as IBM's ASCII codepage 437. Numeric and date/time data are stored internally in a format that the underlying operating system and/or hardware supports.

Specifically, the Database Manager is a database management system (hardware and software) that supports the relational database model in which all data is viewed as a collection of tables. The Database Manager provides a relational command processor called "Database Services" described hereinbelow; a generalized query system for locating data; a system for import and export of data from and to another computer system; and a system for backup and restoration of an individual relational database table, and for table maintenance.

The Database Services is the relational command processor of the Database Manager. It serves a large number of functions which include: a system for storage access; structure query language (SQL) statement processing; database management; lock management; concurrency control; write-ahead logging; recovery services, row-level locking granularity; data recovery in the event of application, system, or record medium failure; and security control.

The PC/IXF architecture allows its Database Services to export a database without need to anticipate the requirements and idiosyncrasies of a receiving (hardware and software) database system. Likewise, a database system importing a PC/IXF file need only understand the PC/IXF architecture; the characteristics of the system which exported the file are of no concern. The PC/IXF file architecture maintains the independence of both the exporting and importing database systems.

The IXF architecture, as a generic relational database exchange format, preferably supports a large set of relational data types, including some data types which perhaps are not supported by a specific relational database product. The PC/IXF file format preserves this flexibility; for example, the PC/IXF architecture supports both single-byte and double-byte string data types. Not all database systems will support all PC/IXF data types; however, even restricted database system implementations will provide for detection and disposition of non-supported data types during import.

Although the present invention is described hereinafter with specific reference to the PC/IXF file, the teachings of the invention are not intended to be limited to a PC environment exclusively. In particular, the invention is not machine-dependent to the PC but can be adapted for use with other computers such as the PS/2 TM and RT TM computers of the IBM Corporation, midrange computers, and the like.

Likewise, while the present invention is described with reference to the OS/2 TM operating system, the invention is not so limited and can be adapted for use with any well known operating system. OS/2 TM, OS/2 Extended Edition TM, OS/2EE TM, PS/2 TM and RT TM are trademarks of IBM Corporation.

FIG. 3 illustrates a typical relational database table. A file which contains such a table uses the terminology table/row/column as opposed to file/record/field or relation/tuple/attribute. As may be seen, the table name is "Cities". The table contains a plurality of horizontal rows, one for each city, each row comprising a plurality of information fields. These information fields are arranged in vertical columns, one for each information field.

In practice, the data records contained in each row of a relational table are selected in a manner shown in FIG. 4. This figure illustrates a possible scheme for allocating D records in the table of FIG. 3. At the top of each column is shown the column name and the type of data contained in the column. The data types are selected from a prescribed set of data types which include, for example:

INTEGER: A four byte integer which represents a whole number between −2,147,483,648 and +2,147,483,647.

VARCHAR: A varying length character string. The maximum length for the string (in bytes) may not exceed 254 bytes. The string is in the codepage prescribed for this column.

CHAR: A fixed length character string with a maximum string length of 254 bytes. The string is in the codepage prescribed for this column.

LONGVARCHAR: A varying length character string which may not exceed 32,767 bytes. This string is in the codepage indicated for this column.

The string itself is preceded by a current length indicator which is a two byte integer specifying the length of the string in bytes.

SMALLINT: A two byte integer which represents a whole number between −32,768 and +32,767.

FLOATING POINT: Either a long (eight byte) or short (four byte) floating point number in IEEE format.

GRAPHIC: A fixed length string of double-byte characters which may not exceed 127. The string is in the codepage specified for this column.

VARGRAPHIC: A varying length string of double byte characters, the maximum number of which may not exceed 127. The codepage for this VARGRAPHIC data is as specified for the column.

To permit compression of the stored data according to the invention the row data is divided up into separate data ("D") records (three in this case), numbered 1, 2 and 3. Each D record terminates at either a varying length field (column) or a field (column) which may contain no data (nulls). In this way, the data records in a particular row need be no longer than the necessary size for the actual data contained in their last field.

As explained above, the file format according to the invention includes column descriptor ("C") records which specify the associated D record identification number (1, 2, 3, etc.) and the associated D record position. The D record position is stored as a byte displacement within the data area portion of the D record for the beginning of the column. In general, a PC/IXF file to be written or read by its Database Services, or output by Database Services, consists of an unbroken sequence of variable length records. The file will have the following types of records in the order given:

One header ("H") record of;

One table ("T") record;

Multiple column descriptor ("C") records (one record for each column of data in the table);

Multiple data ("D") records (each row in the table being represented by one or more "D" records); and zero, one, or Multiple index ("AI") records (each index being defined from the table); and One end ("AE") record.

A PC/IXF file may also contain application specific ("A") records anywhere after the "H" record. These "A" records are allowed in PC/IXF files to enable an application to include additional data, not defined by the PC/IXF format, in a PC/IXF file. For example, "A" records may be used to store indexes of tables and/or to allow multi-diskette storage of a single IXF file. "A" records are to be ignored by any program reading a PC/IXF file which does not have particular knowledge about the data format and content implied by the application identifier in the "A" record.

In the following table, each specific record is described as a sequence of fields, each of which is given a FIELD NAME. For each record, these fields are of a defined length and should appear in the order shown.

| HEADER RECORD | |
|---|---|
| FIELD NAME | FIELD LENGTH (Bytes) |
| record length | 06 |
| record type = "HI" | 01 |
| IXF identifier | 03 |
| IXF version | 04 |
| software product | 12 |
| date written | 08 |
| time written | 06 |
| heading record count | 05 |
| single byte codepage | 05 |
| Double byte codepage | 05 |
| reserved | 02 |

| TABLE RECORD | |
|---|---|
| FIELD NAME | FIELD LENGTH (Bytes) |
| record length | 06 |
| record type = "T" | 01 |
| name length | 02 |
| name of data (table name) | 18 |
| qualifier | 08 |
| data source | 12 |
| data convention = "C" | 01 |
| data format = "M" | 01 |
| machine format = "PC" | 05 |
| data location = "I" | 01 |
| "C" record count | 05 |
| reserved | 02 |
| data description | 30 |

| COLUMN DESCRIPTOR RECORD | |
|---|---|
| FIELD NAME | FIELD LENGTH (Bytes) |
| record length | 06 |
| record type = "C" | 01 |
| column name length | 02 |
| column name | 18 |
| column allows nulls | 01 |
| column selected flag | 01 |
| key column flag | 01 |
| data class | 01 |
| data type | 03 |
| single byte codepage | 05 |
| double byte codepage | 05 |
| column data length | 05 |
| "D" record identifier | 03 |
| column position | 06 |
| column description | 30 |
| number of dimensions | 02 |
| size of each dimension | varying |

| DATA RECORD | |
|---|---|
| FIELD NAME | FIELD LENGTH (Bytes) |
| record length | 06 |
| record type = "D" | 01 |
| "D" record identifier | 03 |
| reserved | 04 |
| columnar data* | varying |

*Including null indicator values and lengths of variable length fields.

| APPLICATION RECORD | |
|---|---|
| FIELD NAME | FIELD LENGTH (Bytes) |
| record length | 06 |
| record type = "A" | 01 |
| application identifier | 12 |
| Applic. specific data | varying |

Figure 5:
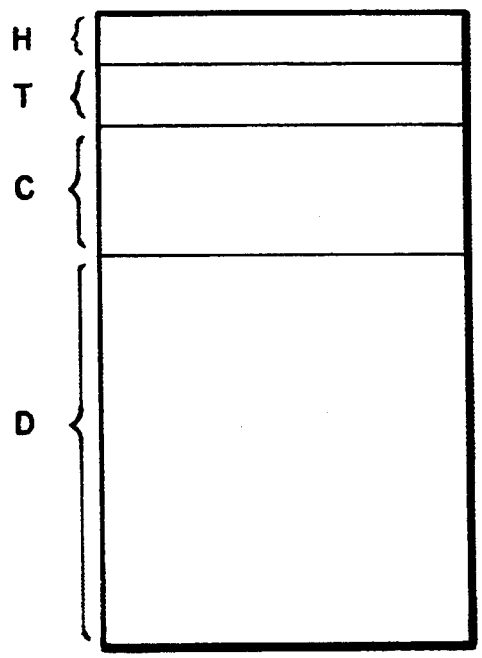
FIG. 5 is a chart showing the arrangement of records in the PC IXF file.

These records are arranged in the file in the order illustrated in FIG. 5. The application record can be located between any other two record types.

Figure 6A:
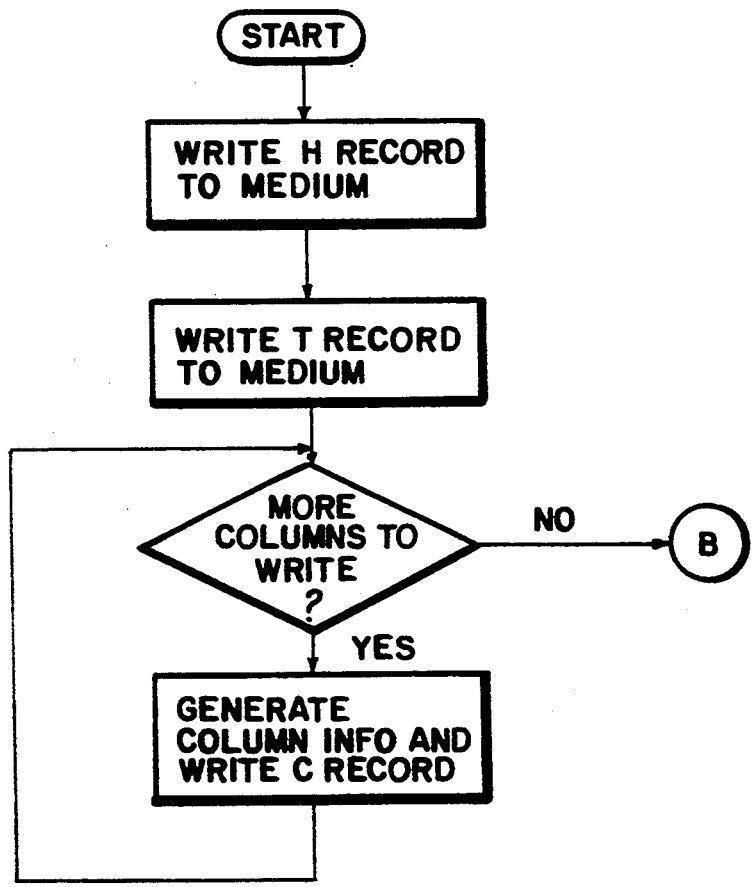
FIGS. 6A and 6B (collectively) are a flow chart for writing a PC/IXF file.
Figure 6B:
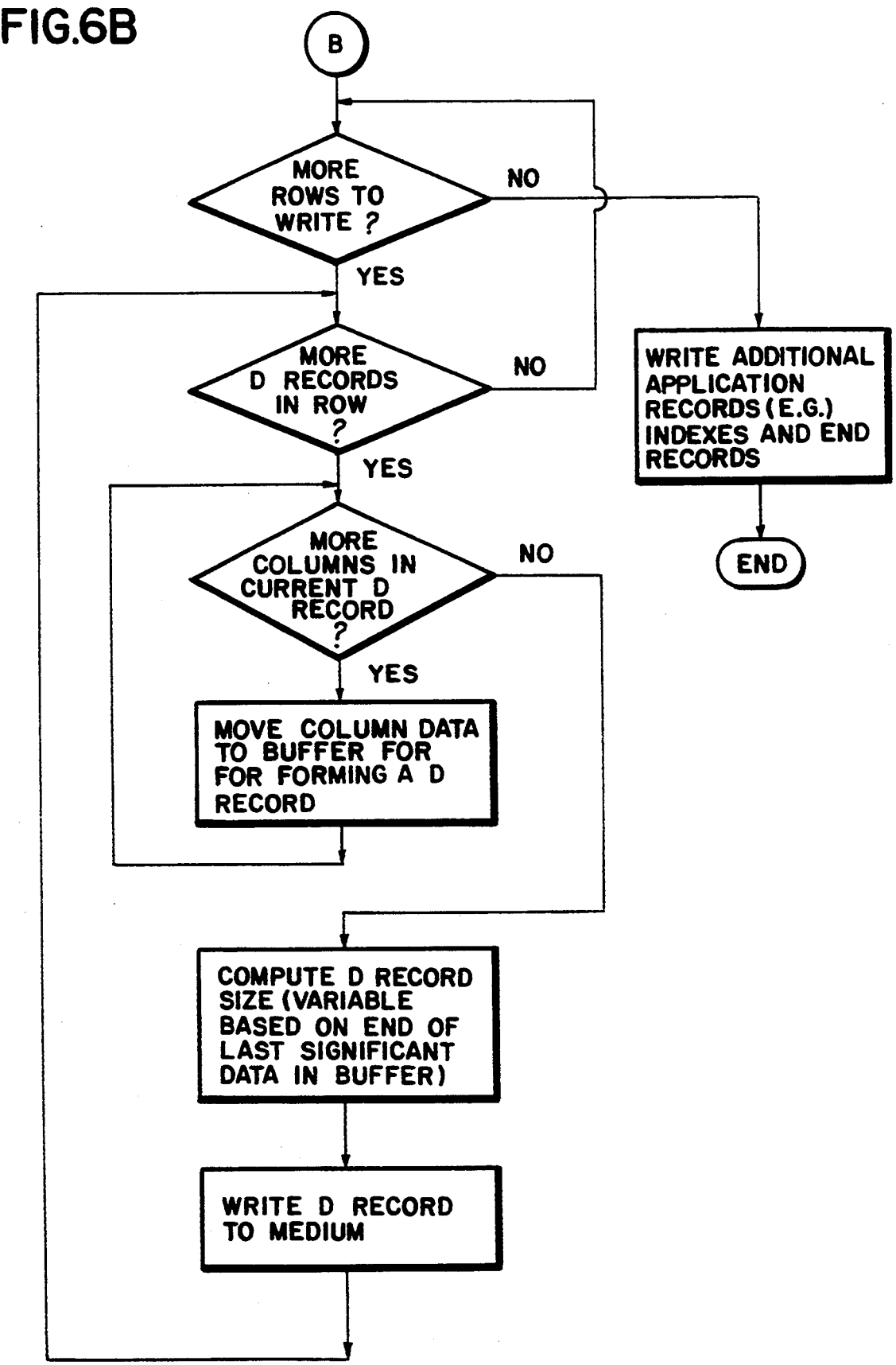

FIGS. 6A and 6B illustrate how a database utility operates to write a PC/IXF file on a record medium.

The process for reading data from the record medium is similar to the procedure for writing.

The first step in storing a table is to write the H record, which includes the codepage environment of the source database. Thereafter, the T record is generated and written onto the record medium. Following the T record, the C records are written one at a time. As explained above, these C records are each associated with one table column and specify:

(1) the identification and prescribed attributes, such as data type, of the column associated with the respective C record;
(2) the identification of the associated D record in a table row which contains the item of data to be located in the associated column;
(3) the maximum number of characters forming an item of data in the associated column if the number is not implied by the data type; and
(4) the position of the associated column in the associated D record.

After all the C records have been written, the program proceeds to write the individual D records for each successive row in the table. The D records are of variable length as the data within the table requires. Preferably, the last field in each D record is either the last column in a row or a column which contains either a variable length data item or a data item which can be nulled.

As may be seen in FIG. 6B, the algorithm first asks if all the rows of data have been written and, if not, whether all the D records in the current row have been considered. If there are no more D records and no more rows to write, the program may write same application specific information such as indexes and/or an ending records, and then the end ("AE") record at the end of the table. If more D records are to be written, the program looks for the last column in the current D record and then computes the D record size from the column data stored in a buffer. This is a variable based on the end of the last significant data in the buffer. Once the size is computed, the D record is written onto the record medium and the program repeats the process with the next D record in the current row and thereafter the first D record in the next subsequent row.

There are thus been shown and described a novel system (apparatus, method and data record) which fulfills all the objects and advantages sought therfor. Many changes, modifications, variations and other uses and applications of the subject convention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

In summary the file format of the present invention surpasses the prior art significantly in numerous respects. First null fields or varying length fields less than their maximum size are compressible. Still further storage of column attributes is ideal for numerous reasons. Attributes of each column are stored precisely once. All attributes (column name, column type, precision, length or maximum length, nullability, code pages) can be stored and the format easily expandable for additional column attributes. Also, all relational types are supported and the format easily expandable for new types.

Still further positive attributes of the invention include that due to the absence of forced conversions of database data, there are no data loss problems attributable to the format and processing time tends to be minimized when the data change is between like-systems. Moreover, code page identification fields allow for a user option to accept or reject data from a different code page environment. Support for additional, application specific records provide further benefit such as the inclusion of additional application specific (A) records. Such records may be used to store indexes of tables for example and further may permit multi-diskette storage of a single IXF file.

What is claimed is:

1. A digital computer system comprising a central processing unit; a record medium for storing data; and read/write means, connected to said central processing unit, for storing on, and retrieving from said record medium a plurality of information records including stored representations of a relational data table formed of a plurality of items of data arranged in both a plurality of table rows and a plurality of table columns, with each item of data having a beginning and an end, and all items of data in any given column being one of (a) fixed length and (b) variable length up to a prescribed maximum length, said read/write means comprising;

(1) means for storing on, and retrieving from said record medium a plurality of data ("D") records each D record being of variable length and including one or more of said items of data from a particular table row, thereby being associated with one table row and at least one table column, each D record having a beginning and an end, said items of data in said particular row being ordered serially in succession in said D record, where being at least one D record associated with each table row, with successive ones of said D records that are associated with each particular table row being associated with the same table columns as corresponding successive ones of said D records that are associated with every other table row, such that the number of D records associated with each table row is the same; and (2) means for storing on, and retrieving from said record medium a plurality of column descriptor ("C") records, each C record being associated with one of said table columns and including, for said one column:
  (i) an identification of said one column;
  (ii) an identification of a D records which include an item of data in said one column; and
  (iii) a number defining absolute displacement of the beginning of the items of data arranged in said one column with respect to the beginning of the D records associated with said one column;

said central processing unit comprising:
(1) addressing means for receiving the column and row location within the relational data table of a desired item of data;
(2) first means, responsive to said addressing means and to said means for retrieving said C records from said record medium, for determining from said C records;
  (i) the identity of the D records that include the received column of the relational data table, and
  (ii) the absolute displacement within the identified D records of said received column; and (3) second means, for retrieving said desired item of data from said record medium, based on the determined D-identification, the absolute displacement and the row location of the desired item of data.

2. The computer system defined in claim 1, wherein said read/write means stores all of said C records ahead of said D records in a series arrangement of records on said record medium.

3. The computer system defined in claim 1, wherein said items of data included in said D records are in a specific codepage environment, and, wherein said read/write means further includes means for storing a header ("H") record which includes a number identifying the specific codepage environment of the items of data.

4. The computer system defined in claim 1, wherein said read/write means further includes means for storing a header ("H") record which includes an identification of a date and time.

5. The computer system defined in claim 1, wherein said read/write means further includes means for storing a table ("T") record which includes an identification of a type of computer machine format with which the plurality of records are compatible.

6. The computer system defined in claim 1, wherein there is a particular quantity of said C records associated with said relational data table, and wherein said read/write means further includes means for storing a table ("T") record which includes a number specifying said quantity of said C records in the plurality of information records.

7. The computer system defined in claim 1, wherein each C record further includes a number specifying its own length.

8. The computer system defined in claim 1, wherein the items of data in each particular column are in a specific codepage environment, and wherein the C record which is associated with each particular column further includes a number identifying the specific codepage environment of such data to be stored in the particular column.

9. The computer system defined in claim 1, wherein said number in each C record defining absolute displacement represents the distance, measured in the number of characters, of the beginning of the particular column with which the C record is associated, from the beginning of the data portion of the D record which includes an item of data in said particular column.

10. The computer system defined in claim 1, wherein each D record further includes an identification code which identifies such D record, and wherein the identification codes for the D records associated with any given row in the table are different from each other.

11. The computer system defined in claim 10, wherein each C record includes the maximum length of the items of data in the column with which the C record is associated.

12. The computer system defined in claim 1, wherein the data in each particular column are one of a plurality of types, and wherein each C record further includes a code specifying the type of data which are entered in the particular column with which the C record is associated.

13. The computer system defined in claim 12, wherein each C record further includes an identification specifying the number of characters in the data in the particular column with which the C record is associated, if such number of characters is fixed, and a maximum number of characters in the data if said data in said particular column is of variable length.

14. A method of storing on, and retrieving from a machine readable record medium, a plurality of records including stored representations of a relational data table formed of a plurality of items of data arranged in both a plurality of table rows and a plurality of table columns, with each item of data having a beginning and an end, and all items of data in any given column being one of (a) fixed length and (b) variable length up to a prescribed maximum length, said storing and retrieving method comprising the steps of:

(1) automatically storing on said record medium a plurality of data ("D") records, each D record being of variable length and including one or more items of data from a particular table row, thereby being associated with one table row and at least one table column, each D record having a beginning and an end, said items of data in said particular row being ordered serially in successsion in said D record, there being at least one D record associated with each table row, with successive ones of said D records that are associated with each particular table row being associated with the same table columns as corresponding successive ones of said D records that are associated with every other table row, such that the number of D records associated with each table row is the same; and (2) automatically storing a plurality of column descriptor ("C") records on said record medium, each C record being associated with one table columns and including, for said one column:
   (i) an identification of said one column;
   (ii) an identification of the D records which include an item of data in said one column; and
   (iii) a number defining absolute displacement of the beginning of items of data arranged in said one column with respect to the D records associated with said one column;

(3) automatically retrieving said C records from said record medium in response to a request to retrieve a desired item of data in a particular column and row location in said relational data table;

(4) automatically identifying from said C records the identity of a D record and the absolute displacement within such D record of said particular location in said relational data table;

(5) automatically retrieving from said record medium said D record identified in step (4); and (6) automatically determining said desired item of data from said absolute displacement.

* * * * *